United States Patent
Cheng et al.

(10) Patent No.: US 10,306,533 B2
(45) Date of Patent: May 28, 2019

(54) METHODS AND APPARATUSES FOR FACILITATING DORMANT CELL DISCOVERY

(71) Applicant: Alcatel-Lucent, Paris (FR)

(72) Inventors: Fang-chen Cheng, Randolph, NJ (US); Said Tatesh, Swindon (GB)

(73) Assignee: ALCATEL LUCENT, Boulogne-Billancourt (FR)

( * ) Notice: Subject to any disclaimer, the term of this patent is extended or adjusted under 35 U.S.C. 154(b) by 365 days.

(21) Appl. No.: 14/222,107

(22) Filed: Mar. 21, 2014

(65) Prior Publication Data

US 2015/0271738 A1    Sep. 24, 2015

(51) Int. Cl.
| | |
|---|---|
| *H04W 40/24* | (2009.01) |
| *H04W 16/24* | (2009.01) |
| *H04W 48/16* | (2009.01) |
| *H04W 52/02* | (2009.01) |

(52) U.S. Cl.
CPC ......... *H04W 40/246* (2013.01); *H04W 16/24* (2013.01); *H04W 48/16* (2013.01); *H04W 52/0206* (2013.01); *Y02B 60/50* (2013.01); *Y02D 70/00* (2018.01)

(58) Field of Classification Search
CPC .............. H04W 40/246; H04W 48/16; H04W 52/0206; H04W 16/24
See application file for complete search history.

(56) References Cited

U.S. PATENT DOCUMENTS

2014/0235243 A1*  8/2014  Damnjanovic ... H04W 52/0206
                                                         455/436

FOREIGN PATENT DOCUMENTS

| WO | WO-2011025295 A2 | 3/2011 |
|---|---|---|
| WO | WO-2013163587 A1 | 10/2013 |

OTHER PUBLICATIONS

3GPP TSG RAN WG1 Meeting #76; R1-140037; Small Cell on/off Transition Time Reduction.*
3GPP TSG RAN WG1 Meeting #74BIS; R1-134496; Views on Small Cell on/off With Small Cell Discovery.*
3GPP TSG RAN WG1 Meeting #76; R1-140038; Enhancements of RRM Measurements for Small Cell on/off.*

(Continued)

*Primary Examiner* — Marcus Hammonds
(74) *Attorney, Agent, or Firm* — Harness, Dickey & Pierce, P.L.C.

(57) ABSTRACT

A method of facilitating dormant small cell discovery in a wireless communications network including at least a small cell and a second cell includes changing, at the small cell, an operating state of the small cell from an active state to a dormant state, the dormant state being a state in which the small cell transmits discovery signals and does not transmit DL broadcast or DL control channels, the discovery signals being signals through which user equipments (UE)s discover the dormant small cell; sending, from the dormant small cell, a notification, the notification identifying, for at least the second cell, a duty cycle with which the first small cell will periodically transmit the discovery signals; and transmitting, from the dormant small, the discovery signals using a periodic transmission pattern that includes active portions and non-active portions defined by the duty cycle.

13 Claims, 5 Drawing Sheets

(56) References Cited

OTHER PUBLICATIONS

3GPP TR36.872v12.1.0, "Small Cell Enhancements for E-UTRA and E-UTRAN—Physical Layer Aspects (Release 12)".
R1-140161, "System design for transition time reduction and legacy UEs impacts for small cell on/off", Alcatel-Lucent, Alcatel-Lucent Shanghai Bell.
Fujitsu, "Discussion on discovery and measurement of turned-off small cells," 3GPP Draft; R1-134257, XP050717420, Guangzhou, China, Oct. 2013.
LG Electronics, "Discussion on small cell on/off operation," 3GPP Draft; R1-140318, XP050735866, Praque, Czech Republic, Feb. 2014.
International Search Report (PCT/ISA/210) and Written Opinion (PCT/ISA/237) for International Application No. PCT/US2015/019828 dated Jun. 8, 2015.
Huawei et al., "Enhancements of RRM measurements for small cell on/off," 3GPP Draft; R1-140038, Feb. 9, 2014, XP050735605.

\* cited by examiner

301

351

METHODS AND APPARATUSES FOR FACILITATING DORMANT CELL DISCOVERY

BACKGROUND OF THE INVENTION

1. Field

The present invention relates generally to the signal design for user equipment (UE) discovery of dormant cells in wireless communications networks.

2. Related Art

Heterogeneous wireless networks include macro cell base stations (BSs) and small cell base stations BSs. Macro cell base stations provide wireless coverage for user equipment (UEs) within macro cells which cover large geographical areas, while small cell BSs may be underlaid with respect to the macro cell BSs in order to provide wireless coverage for UEs located in small cells which cover smaller geographical areas within the coverage area of a macro cell.

Small cell BSs may affect the quality of service experienced by users of a heterogeneous wireless network by providing supplemental support for UEs within portions of the geographical area covered by the macro cell BS where small cell BSs are placed. In some wireless network implementations, a small cell is capable of switching between active state and dormant state. In an active state, the small cell is activated, thereby providing wireless coverage for UEs in range of the small cell, and in a dormant state, the small cell does not provide wireless coverage for UEs.

SUMMARY OF THE INVENTION

According to at least one example embodiment, a method of facilitating dormant small cell discovery in a wireless communications network including at least a first small cell and a second cell includes changing, at a first small cell base station (BS) controlling the first small cell, an operating state of the first small cell from an active state to a dormant state, the active state being a state in which the small cell transmits downlink (DL) signals including a primary synchronization signal (PSS), a secondary synchronization signal (SSS), and a cell-specific reference signal (CRS), transmits DL broadcast channels, and transmits DL control channels, the dormant state being a state in which the first small cell transmits discovery signals and does not transmit DL broadcast or DL control channels, the discovery signals being signals through which user equipments (UE)s discover the first small cell while the first small cell is in the dormant state; sending, from the first small cell BS while the first small cell in the dormant state, a notification, the notification identifying, for at least the second cell, a duty cycle with which the first small cell will periodically transmit the discovery signals; and transmitting, from the first small cell BS while the first small cell is in the dormant state, the discovery signals using a periodic transmission pattern, the periodic transmission pattern including active portions during which the first small cell transmits the discovery signals and non-active portions during which the first small cell does not transmit the discovery signals, the active and non-active portions being defined by the duty cycle.

The wireless communications network may be a long term evolution (LTE) network implementing a small cell on/off interference mitigation scheme, and the discovery signals may include PSS, SSS, and CRS signals.

According to at least one example embodiment, a method of facilitating dormant small cell discovery in a wireless communications network including at least a first small cell and a second cell, the first small cell being in a dormant state in which the first small cell does not transmit downlink (DL) broadcast or DL control channels and the first small cell does transmit discovery signals using a periodic transmission pattern, the periodic transmission pattern including active transmission portions during which the small cell transmits the discovery signals and non-active transmission portions during which the small cell does not transmit the discovery signals, includes receiving, at a user equipment (UE) attached to the second cell, search control information sent from the second cell; and configuring, at the UE, a duty cycle of a signal measurement pattern of the UE based on the received search control information, the signal measurement pattern including active reception portions during which the UE actively listens for the discovery signals and non-active reception portions during which the UE does not actively listen for the discovery signals; receiving, at the UE, the discovery signals; and discovering, at the UE, the first small cell based on the discovery signals, wherein the search control information causes the UE to configure a duty cycle of the periodic signal measurement pattern of the UE such that the active reception portions of the periodic signal measurement pattern align with the active transmission portions of the periodic transmission pattern.

The UE may be a Release (Rel-)8, Rel-9, Rel-10, or Rel-11 UE.

IDLE mode UEs may not be able to access the first small cell while the first small cell is in the dormant state because the dormant first small cell does not transmit either of the DL broadcast and DL control channels.

The wireless communications network may be a long term evolution (LTE) network implementing a small cell on/off interference mitigation scheme, and the discovery signals received at the UE may include a primary synchronization signal (PSS), a secondary synchronization signal (SSS), and a cell-specific reference signal (CRS).

The UE may discover the first small cell based on the PSS and SSS signals.

The method may further include performing, at the UE, radio resource management (RRM) measurements on signals of the first small cell based on the CRS.

The method may further include performing, at the UE, channel tracking with respect to the first small cell based on the CRS.

According to at least one example embodiment, a method of facilitating dormant small cell discovery in a wireless communications network including at least a first cell and a second cell, the second cell being in a dormant state in which the second cell does not transmit downlink (DL) broadcast or DL control channels and the second cell does transmit discovery signals using a periodic transmission pattern, the periodic transmission pattern including active transmission portions during which the second cell transmits the discovery signals and non-active transmission portions during which the second cell does not transmit the discovery signals, include receiving, at the first cell, a notification sent by the second cell, the notification identifying a duty cycle indicating lengths of the active transmission portions of the periodic transmission pattern used by the second cell to transmit the discovery signals; generating, at the first cell, search control information based on the duty cycle identified by the notification received from the second cell; and sending, from the first cell to one or more first UEs attached to the first cell, the search control information, the search control information including information for causing the one or more UEs to configure respective duty cycles of periodic signal measurement patterns of the one or more UE such that active reception portions of the periodic signal measurement patterns align with the active transmission portions of the periodic transmission pattern of the second small cell, the periodic signal measurement patterns of the one or more UEs each including both the active reception portions during which the one or more UEs actively listen for discovery signals and non-active reception portions during which the one or more UEs do not actively listen for discovery signals.

The one or more UEs to which the first cell sends the search control information may be Release (Rel-)8, Rel-9, Rel-10, or Rel-11 UEs, and the wireless communications network may be a long term evolution (LTE) network implementing a small cell on/off interference mitigation scheme.

IDLE mode UEs may not be able to access the second small cell while the second small cell is in the dormant state because the second small cell does not transmit either of the DL broadcast and control channels.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
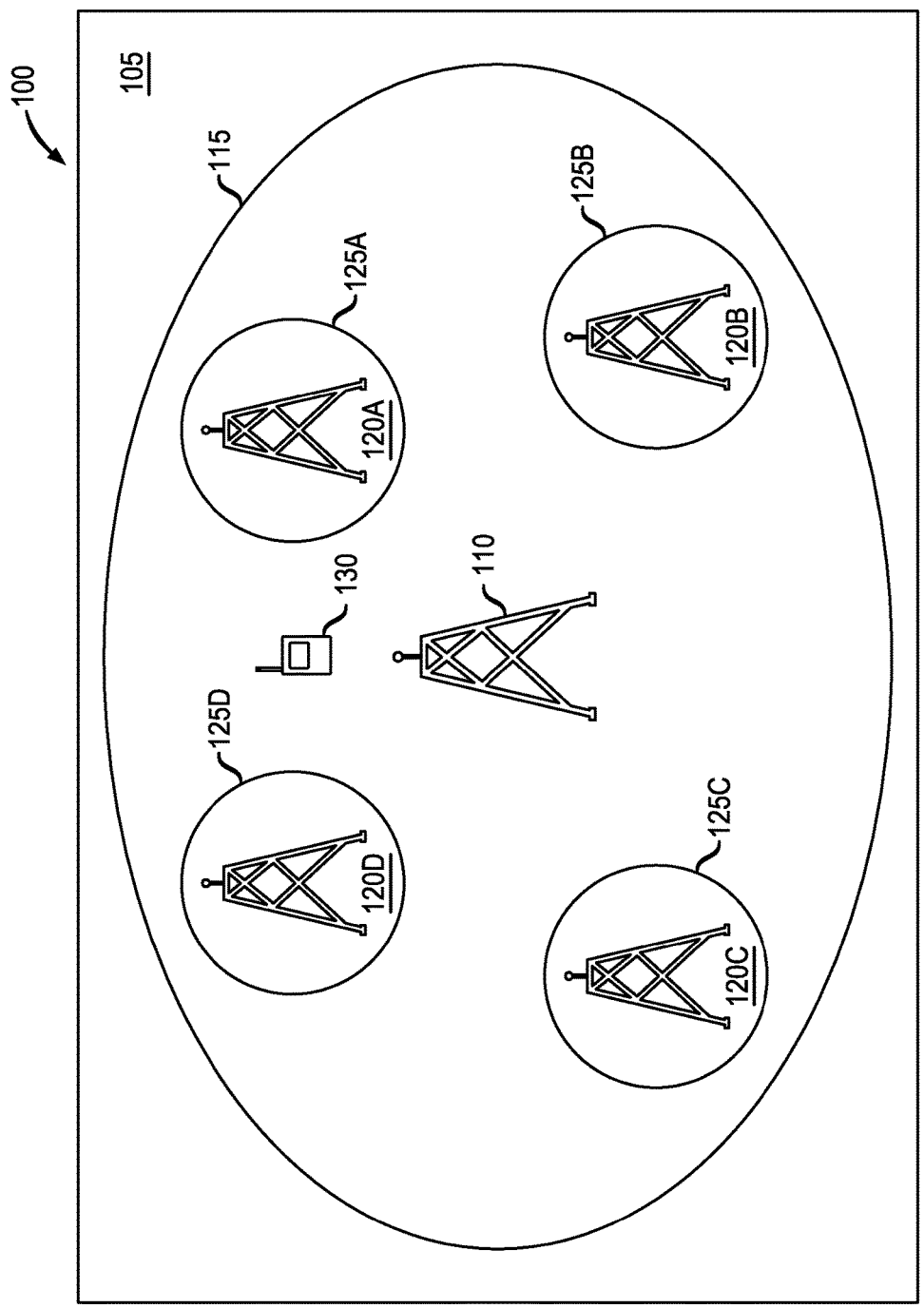
FIG. 1 illustrates a portion of a wireless communications network according to at least one example embodiment.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a access terminal, terminal, mobile, mobile unit, mobile station, mobile user, subscriber, user, remote station, receiver, etc., and may describe a remote user of wireless resources in a wireless communication network. The term base station (BS) may be considered synonymous to and/or referred to as an evolved Node B (eNB), base transceiver station (BTS), NodeB, access point, etc., and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware including one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Example Network Architecture

FIG. 1 illustrates a portion of a wireless communications network 100 associated with a geographical region 105. Referring to FIG. 1, wireless communications network 100 may follow, for example, a long term evolution (LTE) protocol and implement, for example, an evolved universal mobile telecommunications system (UMTS) terrestrial radio access network (EUTRAN) architecture. Wireless communications network 100 includes a macro cell base station (BS) 110; a plurality of small cell BSs 120A-D; and a UE 130. Though, for the purpose of simplicity, communications network 110 is illustrated as having only macro cell BS 110; small cell BSs 120A-D; and UE 130, communications network 100 may have any number of macro cell BSs, small cell BSs and UEs. The macro cell BS 110 and small cell BSs 120A-D may be connected to, for example, one or more mobility management entities (MME) (not shown) included in the communications network 100.

The macro cell BS 110 may be, for example, an evolved node B (eNB) providing wireless coverage for mobiles within a coverage area 115. Small cell BSs 120A-D may be, for example, eNBs underlaid with respect to the macro cell BS 110.

The underlaid small cell BSs 120A-D provide wireless coverage for mobiles within coverage areas 125A-D that supplements coverage provided by the macro cell BS 110. UEs, like the UE 130, within both the coverage area 115 of the macro cell BS 110 and one of the coverage areas 125A-D of small cell BSs 120A-D may be in communication with the communications network 100 via a wireless connection to either the macro cell BS 110 or one of the small cell BSs 120A-D.

Actions described herein as being done to or performed by a cell (e.g., a macro cell or a small cell) may be done to or performed by the BS corresponding to or controlling the cell.

The small cell BSs 120A-D are configured to implement the small cell on/off interference mitigation scheme which will be discussed in greater detail below.

Overview of Small Cell ON/OFF Interference Mitigation Scheme

Small cell on/off is an interference mitigation scheme in which a small cell may switch between an active and a dormant state. Small cell on/off may be used, for example, dense small cell deployments. The small cell ON/OFF interference mitigation mechanism includes turning off a small cell to reduce the interference to neighboring cells when data traffic are not served by the small cell and turned on when data traffic would be served by the small cell. In dense small cell deployments, a UE could be covered by one or more small cells. Turning small cell ON or OFF is a network control scheme for system operation and performance optimization.

Procedures and measurements associated with initiating small cell on/off transitions, as well as definitions and explanations of terms associated with small cell on/off and Release 12 in general, are discussed in 3GPP TR36.872 V12.1.0, the entire contents of which is incorporated herein by reference.

Small cell on/off may improve the system capacity of a wireless communications network through interference mitigation when the cell switching transition time is below 40 ms. The gain of system performance increases as the transition time decreases. An example transition time of service switching from one cell to another is currently in the range of hundreds of ms to seconds. In order to reduce the transition time of service switching to, for example, below 40 ms, it may be desirable for the procedures and measurements associated with small cell on/off transitions to be done when the small cell is in the dormant state. Procedures for initiating a small cell on/off transition may include determining that one or more UEs are in proximity of a dormant cell, and completing signal quality measurements at the UE with respect to signals transmitted by the dormant cell.

Accordingly, it may be desirable to select discovery signals that can be transmitted by dormant small cells and used by UEs to discover the dormant small cells in order to facilitate the initiation and completion of the procedures and measurements associated with small cell on/off transitions. Discovery signals will now be discussed in greater detail below.

Overview of Discovery Signal Design

It is desirable for small cells in the dormant state to transmit a downlink (DL)-synchronization signal (SS)/reference signal (RS) burst with low duty cycle for cell identification, coarse time/frequency synchronization, intra-/inter-frequency radio resource management (RRM) measurement of cells and quasicolocation (QCL). The RRM measurements of DL discovery signals are used by UEs to perform required mobility procedures while a small cell is still in the dormant state in preparation for the small cell transitioning into an active state. DL discovery signals may also be used for channel tracking in order to increase the speed of a switchover or handoff operation of UE to recently activated small cell.

Signals that may be included in the DL-SS/RS sent by dormant small cells for facilitation of discovery by UEs include primary synchronization signal (PSS)/secondary synchronization signals (SSS)/CRS, channel state information (CSI)-reference signal (RS), positioning reference signal (PRS), modified SS/received signal strength (RSS) or new discovery signal. Legacy (e.g., Release 8 (Rel.-8)) PSS/SSS/CRS are transmitted from a small cell in active state as usual so that the legacy UEs can search the active small cell. The dormant small cells can transmit existing PRS or CSI-RS as the discovery signals with coordination of configuration. However, PRS and CSI-RS are not used for RRM measurements for legacy UEs If modified SS/RS or new discovery signals are specified for the dormant cell, Rel-12 UE can effectively detect modified SS/RS or discovery signals of multiple small cells at the same time. The modified SS/RS or new discovery signals may not be detectable by legacy UEs. Examples of legacy UEs include Rel. 8, Rel. 9, Rel. 10, and Rel. 11 UEs.

It may be desirable for DL discovery design to achieve the following goals: dormant cell discovery, RRM measurements and reporting, and channel tracking and CSI measurements. Each of these goals is now discussed below.

Dormant Cell Discovery

One focus of DL discovery signals is to allow Release 12 (Rel-12) UEs to discover the dormant small cells, which is similar to a cell search of active cells. One benefit of PSS/SSS for cell search in Rel-8 is having fast search at low signal to interference plus noise ratio (SINR), e.g. −6 dB, in both synchronous and asynchronous networks. The Release 11 (Rel-11) PSS/SSS interference cancellation (IC) feature pushes the UE cell detection process even further to support SINR at −9 dB. The PSS and SSS sequences may be chosen with desirable autocorrelation and cross-correlation properties in both synchronous and asynchronous reception. Other DL-SS/RSs, such as CSI-RS, PRS or modified RS, might have good autocorrelation and cross-correlation properties in synchronous reception. However, other DL-SS/RSs, such as CSI-RS, PRS or modified RS may not perform desirably well when multiple discovery signals do not arrive, for example at a UE, aligned in time. This misalignment associated with other DL-SS/RSs, such as CSI-RS, PRS or modified RS may lead to greater limitations with respect to dormant cell discovery at relatively higher SINRs when compared to that of PSS/SSS in both synchronous and asynchronous deployment scenarios. Further, the selection of other DL-SS/RS as the discovery signals may result in wireless communications network being limited to operating only in synchronous network deployment, which may be undesirable in mixed outdoor and indoor small cell deployment scenarios. One concern associated with using PSS/SSS as discovery signals is that the number of cell IDs at 504 may be insufficient for dense small cell deployments. However, if a network operator desires an extension of cell ID space, new root sequences may be implemented for PSS in addition to current 3 root sequences.

Consequently, PSS/RSS signals are desirable for use as small cell on/off discovery signals. Additionally PSS root sequences can be used for physical cell identity (PCI) extension if a number of cell IDs becomes insufficient.

According to at least one example embodiment, dormant small cells in wireless communications network 100 transmit PSS/RSS signals as discovery signals for use by UEs. Further, according to at least one example embodiment, UEs of the wireless communications network 100 detect PSS/RSS signals transmitted by dormant small cells and discover the dormant small cells based on the detection. UEs may use PSS/RSS signals in order to detect cell in accordance with known methods.

RRM Measurements and Reporting

UEs perform RRM measurements, such as reference signal received power (RSRP), and report the RRM measurements back to the EUTRAN after a dormant cell is detected. The RRM measurements are used for UE cell selection and handover with respect to cells in the active state. Further, RRM measurements may be used for determining small cell ON/OFF for small cells in the dormant state. Example criteria of discovery signal design for RRM measurements are as follows: periodic transmission and reliable RRM measurements. Each of these criteria is now discussed below.

Periodic transmission—In order to support UE mobility, it may be desirable for discovery signals for RRM measurements to be transmitted periodically. The period of discovery signals transmission may be determined by taking into account the UE mobility in a small cell.

Reliable RRM measurements—Density of discovery signals within a period of transmission should be sufficiently high to have reliable RRM measurements. RRM measurements may be used to trigger the procedure for UE mobility including, for example, handover operations and cell selection/re-selection operations. By using reliable RRM measurements, short-term channel effects, such as fast fading and slow fading, may be filtered out, and coverage information, such as pathloss, may be singled out.

Since the UE mobility in a dormant small cell is generally low, the duty cycle of each RRM measurement period used by a dormant small cell should be long to minimize the interference to the neighboring cells caused by discovery signals designed for RRM measurements. For example, dormant small cells may transmit the discovery signals in a short period of time and turn off for a long period of time, similar to UE discontinuous (DRX). Another consideration is the impact to the legacy UEs. Legacy UEs use CRSs for RSRP/reference signal received quality (RSRQ) measurements. CRSs may be dense in each subframe and transmitted periodically, at for example, a 1 ms period for frequency division duplex (FDD) and at least a 5 ms period for time division duplex (TDD). Although PRSs and CSI-RSs may be transmitted periodically with sufficient density, legacy UEs generally do not perform RRM measurements based on PRS and CSI-RS. Consequently, in order to support measurements by legacy UEs, it is desirable to use CRSs as the discovery signals for RRM measurements.

According to at least one example embodiment, dormant small cells in the wireless communications network 100 transmit CRS signals in order to enable UEs to perform reliable RRM measurements. According to at least one example embodiment, UEs of the wireless communications network 100 receive CRS signals transmitted by dormant small cells and use the CRS signals in order to perform reliable RRM measurements. UEs may use CRS signals to perform RRM measurements in accordance with known methods.

Channel Tracking and CSI Measurements

It is desirable for UEs to perform channel tracking and CSI measurements when the small cell is in the dormant state in order to reduce the transition time to, for example, less than 40 ms. It is desirable for the discovery signals transmitted by a dormant small cell to enable UEs to perform CSI measurements with respect to the dormant small cell and be ready to feed the CSI measurements back to the network when the dormant cell is triggered to turn on. The discovery signals transmitted by dormant small cells operating as part of the small cell on/off interference mitigation scheme may also be used for coarse time and frequency synchronization, cell/transmission point identification, RSRP/RSRQ measurements, and other purposes to enhance measurements taken by UEs with respect to dormant small cells. For channel tracking purposes, it is desirable for discovery signals transmitted by a dormant small cell UE to have a duty cycle not too long to prevent UEs from losing sync and having to rediscover and to re-synchronize with the dormant cell. It is desirable for the discovery signals to enable UEs to compensate the channel for CSI measurements and have reliable CSI feedback to the network when the dormant cell is triggered to turn on. Examples of signals that can be used as discovery signals in order to enable UEs to perform channel tracking include PSS/SSS, CRS, CSI-RS, and PRS. The density and periodicity of CRS may be much higher than those of PSS/SSS, CSI-RS and PRS. Moreover, legacy UEs use CRS for channel tracking. Thus, it is desirable to use CRS as the discovery signals for channel tracking and channel compensation for CSI measurements.

According to at least one example embodiment, dormant cells in the wireless communications network 100 transmit CRS signals in order to enable UEs to perform channel tracking and CSI measurements. According to at least one example embodiment, UEs of the wireless communications network 100 receive CRS signals transmitted by dormant small cells and use the CRS signals in order to perform channel tracking and CSI measurements. UEs may use the CRS signals to perform channel tracking and CSI measurements in accordance with known methods.

Discovery Signal Duty Cycle

According to at least one example embodiment, small cells of the wireless communications network 100 transmit discovery signals, for example the PSS/SSS/CRS signals discussed above, using a periodic transmission cycle that alternates between active and discontinuous transmission (DTX) states.

Figure 2:
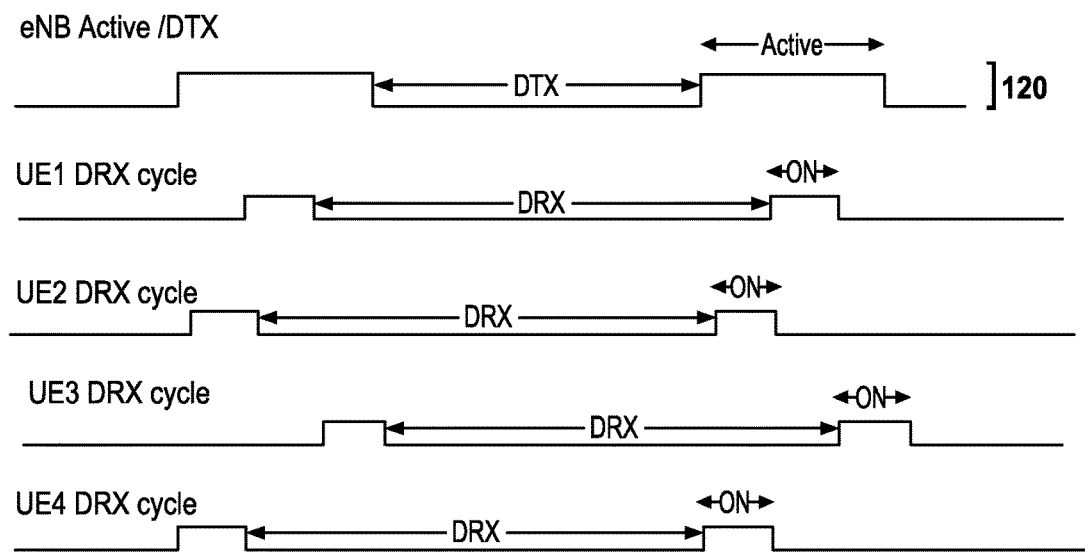
FIG. 2 is a timing chart illustrating a waveform including the active and discontinuous transmission (DTX) portions of a dormant small cell discovery signal transmission pattern a according to at least one example embodiment.

FIG. 2 is a timing chart illustrating a waveform including the active and DTX portions of a dormant small cell discovery signal transmission pattern 210 according to at least one example embodiment. During active portions of the discovery signal transmission pattern, the dormant small cell transmits discovery signals including, for example the PSS/SSS/CRS signals. During DTX portions of the discovery signal transmission pattern, the dormant cell does not transmit discovery signals. For example, the dormant small cell may transmit no signals during the DTX portion of the discovery signal transmission pattern. Further, according to at least one example embodiment, dormant cells do not transmit DL broadcast or control channels while dormant (e.g., not during the active or DTX portions of the discovery signal transmission pattern).

FIG. 2 also shows waveforms corresponding to on/discontinuous reception (DRX) measurement pattern of Legacy UEs 1-4. According to at least one example embodiment, during 'on' portions of the on/DRX measurement pattern, the legacy UEs actively listen for discovery signals including, for example, the PSS/SSS/CRS signals, and during DRX portions of the discovery signal transmission pattern, the Legacy UEs do not listen for discovery signals. The DRX portion of the measurement period employed by the Legacy UEs may help conserve battery power of the Legacy UEs. Further, the 'on' and DRX states of a legacy UE may be controlled by the cell to which the legacy UE is attached. For example a cell can control when a legacy UE attached to the cell wakes up from a DRX state (i.e, enters an 'on' state after being in a DRX state), and when a UE reenters the DRX state.

According to at least one example embodiment, the transmission time, the length of active transmission state, and the duty cycle of the discovery signals may all be configured by the an operator of the wireless network 100 or by the small cells themselves. For example, it is desirable for the small cells to configure the duration of active state longer than an amount of time required for UEs to complete reliable RSRP/RSRQ measurements for RRM. By choosing the length of the active transmission state in this manner, the false triggering of a small cell switching from a dormant state to an active state may be avoided, and a handover of UE to a cell with an undesirable radio condition may also be avoided.

According to example embodiments, the configuration of discovery signals for dormant cells in the wireless network 100 are provided to the neighboring cells in the active state. For example, after the discovery signals of a dormant small cell are configured, the dormant small cell may provide the configuration of the discovery signals to active neighbor cells of the dormant cell. A Rel-12 CONNECTED mode UE will be informed of the configuration of the discovery signals of neighboring small cells in the dormant state by the serving cell of the UE for example, through higher layer signaling (RRC signaling).

Legacy UEs will search PSS/SSS and measure CRS autonomously. If the duty cycle of PSS/SSS/CRS discovery signals is the union of the on portions of the on/DRX measurement patterns of one or more legacy UEs, as shown in FIG. 2, the one or more legacy UEs will detect the dormant small cell associated with the discovery signal and trigger handover request to their serving cells once RSRP/RSRQ measurements satisfy the event triggering criteria (e.g., Event A3). Although UEs are free to perform measurement during DRX cycle when dormant cells do not transmit PSS/SSS/CRS in the DTX state, the measurement results would not affect the measurement results in the RRM procedures since the length of the DTX state should be over a few to tens of seconds.

Further, according to at least one example embodiment, a serving cell of a legacy UE sends control signals to the legacy UE causing the legacy UE to set a measurement duty cycle of the legacy UE such that 'on' portions of the on/DRX measurement pattern of the UE align with active portions discovery signal transmission pattern of the dormant small cell. For example, as is illustrated in FIG. 2, the on portions of the on/DRX measurement pattern of Legacy UEs 1-4 align with the active portions of the dormant small cell discovery signal transmission cycle 210. Consequently, due to the above-referenced alignment of signals, the discovery signals sent by a dormant small cell in accordance with the dormant small cell discovery signal transmission cycle 210 will be received by the legacy UEs and interpreted by the legacy UEs as a regular transmission of PSS/SSS/CRS signals by an active cell, even though the signals are being transmitted by the dormant cell. Thus, by using the same cell discovery mechanisms used by the legacy UEs for discovering active cells, the legacy UEs of wireless network 100 are able to discover dormant small cells.

Example Apparatuses for Facilitating Dormant Cell Discovery

Figure 3A:
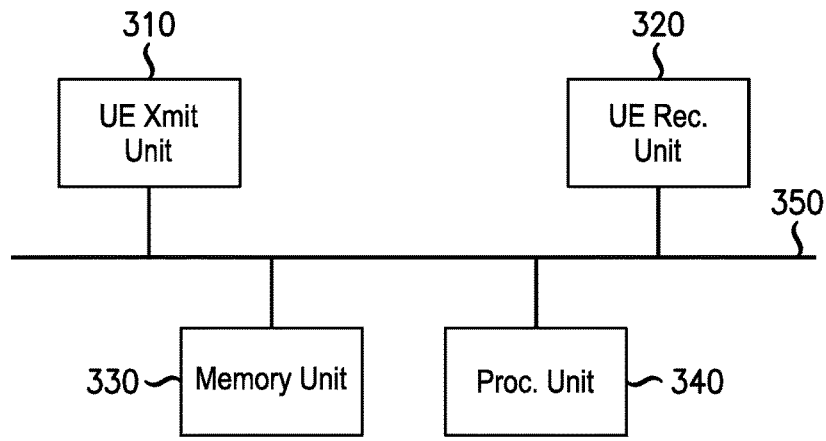
FIG. 3A is a diagram illustrating an example structure of a user equipment (UE).

FIG. 3A is a diagram illustrating an example structure of a UE 301. Any UE described herein, including for example the UE 130, may have the structure and operation of the UE 301 described below. The UE 301 may include, for example, a UE transmitting unit 310, a UE receiving unit 320, a memory unit 330, a processing unit 340, and a data bus 350.

The UE transmitting unit 310, UE receiving unit 320, memory unit 330, and processing unit 340 may send data to and/or receive data from one another using the data bus 350. The UE transmitting unit 310 is a device that includes hardware and any necessary software for transmitting wireless signals on an uplink (reverse link) channel including, for example, data signals or control signals, via one or more wireless connections to other wireless devices (e.g., eNBs).

The UE receiving unit 320 is a device that includes hardware and any necessary software for receiving wireless signals on a downlink (forward link) channel including, for example, data signals or control signals, via one or more wireless connections from other wireless devices (e.g., eNBs).

The memory unit 330 may be any storage medium capable of storing data including, for example, magnetic storage, flash storage, etc.

The processing unit 340 may be any device capable of processing data including, for example, a processor. As used herein, the term 'processor' refers to a machine that is structurally configured to carry out specific operations, or structurally configured to execute instructions included in computer readable code. Examples of the above-referenced processor include, but are not limited to, a microprocessor, a multiprocessor, a central processing unit (CPU), a digital signal processor (DSP), an application specific integrated circuit (ASIC), and a field programmable gate array (FPGA).

Figure 3B:
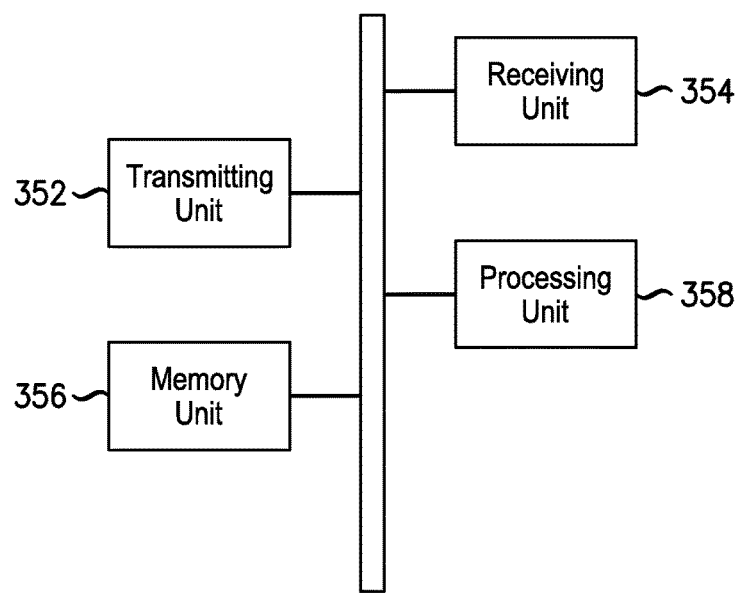
FIG. 3B is a diagram illustrating an example structure of a base station (BS).

According to at least one example embodiment, any operations described herein, for example with reference to any of FIGS. 1-5, as being performed by a UE (e.g., the UE 130), may be performed by an UE having the structure of the UE 351 illustrated in FIG. 3B. For example, according to at least one example embodiment, the UE 351 may be programmed, in terms of software and/or hardware, to perform any or all of the functions described herein as being performed by a UE.

Examples of the UE 351 being programmed, in terms of software, to perform any or all of the functions described herein as being performed by an UE will now be discussed below. For example, the memory unit 330 may store a program including executable instructions corresponding to any or all of the operations described with reference to FIGS. 1-5 as being performed by an UE. According to at least one example embodiment, additionally or alternatively to being stored in the memory unit 330, the executable instructions may be stored in a computer-readable medium including, for example, an optical disc, flash drive, SD card, etc., and the UE 351 may include hardware for reading data stored on the computer readable-medium. Further, the processing unit 340 may be a processor configured to perform any or all of the operations described with reference to FIGS. 1-5 as being performed by a UE, for example, by reading and executing the executable instructions stored in at least one of the memory unit 330 and a computer readable storage medium loaded into hardware included in the UE 351 for reading computer-readable mediums.

Examples of the UE 351 being programmed, in terms of hardware, to perform any or all of the functions described herein as being performed by an UE will now be discussed below. Additionally or alternatively to executable instructions corresponding to the functions described with reference to FIGS. 1-5 as being performed by an UE being stored in a memory unit or a computer-readable medium as is discussed above, the processing unit 340 may include a circuit that has a structural design dedicated to performing any or all of the operations described with reference to FIGS. 1-5 as being performed by an UE. For example, the above-referenced circuit included in the processing unit 340 may be a FPGA or ASIC physically programmed to perform any or all of the operations described with reference to FIGS. 1-5 as being performed by an UE.

FIG. 3B is a diagram illustrating an example structure of the BS 351. Any BS described herein may have the structure and operation of the BS 351 described below. Referring to FIG. 3B, the BS 351 may include, for example, a data bus 359, a transmitting unit 353, a receiving unit 354, a memory unit 356, and a processing unit 358.

The transmitting unit 353, receiving unit 354, memory unit 356, and processing unit 358 may send data to and/or receive data from one another using the data bus 359.

The transmitting unit 353 is a device that includes hardware and any necessary software for transmitting signals including, for example, control signals or data signals via one or more wired and/or wireless connections to other network element.

The receiving unit 354 is a device that includes hardware and any necessary software for receiving wireless signals including, for example, control signals or data signals via one or more wired and/or wireless connections to other network elements.

The memory unit 356 may be any device capable of storing data including magnetic storage, flash storage, etc.

The processing unit 358 may be any device capable of processing data including, for example, a processor structurally configured to carry out specific operations, or structurally configured to execute instructions included in computer readable code including, for example, code stored in the memory unit 356. Examples of the above-referenced processor include, but are not limited to, a microprocessor, a multiprocessor, a CPU, a DSP, an ASIC, and a FPGA.

According to at least one example embodiment, any operations described herein, for example with reference to any of FIGS. 1-5, as being performed by a BS (e.g., any of macro cell BS 110 and small cell BSs 120A-D), may be performed by an BS having the structure of the BS 351 illustrated in FIG. 3B. For example, according to at least one example embodiment, the BS 351 may be programmed, in terms of software and/or hardware, to perform any or all of the functions described herein as being performed by an BS.

Examples of the BS 351 being programmed, in terms of software, to perform any or all of the functions described herein as being performed by an BS will now be discussed below. For example, the memory unit 356 may store a program including executable instructions corresponding to any or all of the operations described with reference to FIGS. 1-5 as being performed by a BS. According to at least one example embodiment, additionally or alternatively to being stored in the memory unit 356, the executable instructions may be stored in a computer-readable medium including, for example, an optical disc, flash drive, SD card, etc., and the BS 351 may include hardware for reading data stored on the computer readable-medium. Further, the processing unit 358 may be a processor configured to perform any or all of the operations described with reference to FIGS. 1-5 as being performed by a BS, for example, by reading and executing the executable instructions stored in at least one of the memory unit 356 and a computer readable storage medium loaded into hardware included in the BS 351 for reading computer-readable mediums.

Examples of the BS 351 being programmed, in terms of hardware, to perform any or all of the functions described herein as being performed by an BS will now be discussed below. Additionally or alternatively to executable instructions corresponding to the functions described with reference to FIGS. 1-5 as being performed by an BS being stored in a memory unit or a computer-readable medium as is discussed above, the processing unit 358 may include a circuit that has a structural design dedicated to performing any or all of the operations described with reference to FIGS. 1-5 as being performed by a BS. For example, the above-referenced circuit included in the processing unit 358 may be a FPGA or ASIC physically programmed to perform any or all of the operations described with reference to FIGS. 1-5 as being performed by a BS.

Example methods for facilitating dormant small cell discovery will now be discussed in greater detail below with reference to FIGS. 4 and 5.

Example Methods for Facilitating Dormant Cell Discovery

Example methods illustrated in FIGS. 4 and 5 will be discussed with reference to FIG. 1 using an example scenario in which the UE 130 is a legacy UE (for example a Rel.-8, Rel.-9, Rel. 10, or Rel. 11 UE) that is initially attached to the macro cell 115, and the small cell 125A initially enters a dormant state. The method illustrated in FIG. 4 will be explained from the point of view of the small cell 125A, and the method illustrated in FIG. 5 will be explained form the point of view of the UE 130.

Figure 4:
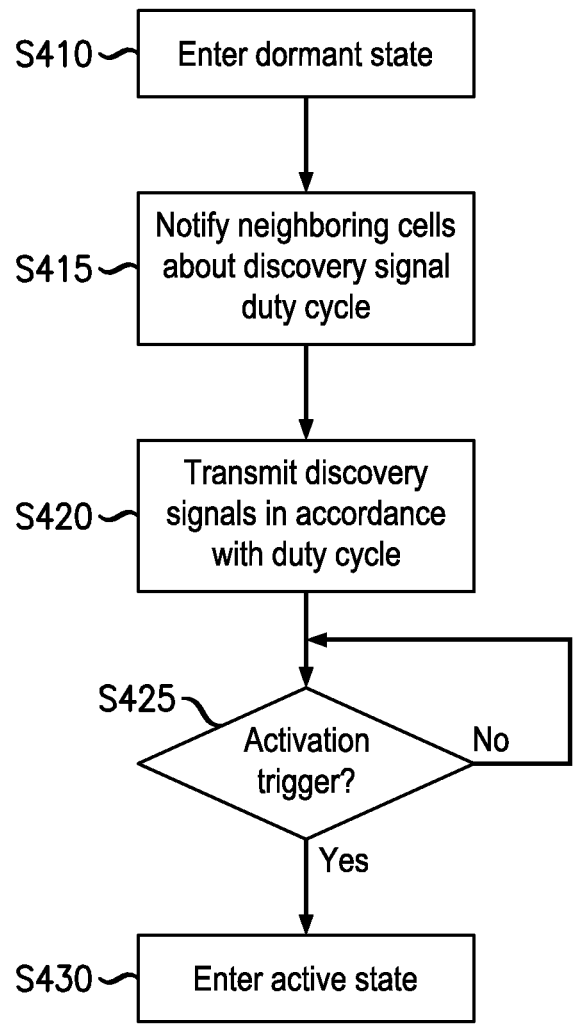
FIG. 4 illustrates an example of operating a small cell BS to facilitate dormant small cell discovery according to at least one example embodiment.

FIG. 4 illustrates an example of operating a small cell BS to facilitate dormant small cell discovery according to at least one example embodiment.

Referring to FIG. 4, in step S410, the small cell 125A enters dormant state.

As is discussed above with reference to FIG. 1, the small cell 125A implements the small cell on/off interference mitigation scheme. Accordingly, the small cell 125A is capable of being in an active state and a dormant state. Some example conditions that trigger a small cell to enter a dormant state in accordance with small cell on/off are discussed in 3GPP TS 36.872 V12.1.0 which, as is discussed above, has been incorporated into the present disclosure.

In step S415, the small cell 125A notifies neighboring cells about the discovery signal duty cycle of the small cell 125A.

As is explained above with reference to FIG. 2, a duty cycle used to transmit discovery signals from a small cell of the wireless network 100 may be set by the small cell, for example autonomously, or, alternatively, by an operator of the wireless network 100. For example, the small cell 125A may set a duty cycle defining a length of the active portion of the small cell discovery signal transmission cycle 210 corresponding to the small cell 125A. The small cell 125A may then notify neighboring cells of the set duty cycle.

For example, according to at least one example embodiment, neighboring cells of the small cell 125A may be cells within a certain geographic region or a certain distance from the small cell 125A. According to at least one example embodiment, neighboring cells of the small cell 125A may be cells within a subnet to which the small cell 125A belongs. According to at least one example embodiment, neighboring cells of the small cell 125A may be active cells transmitting signals that are measured at the small cell 125A as having signal power and/or quality above a reference threshold value. In the example illustrated in FIG. 1, the macro cell 115 and the small cells 125B-D are all neighboring cells of the small cell 125A. Consequently, in step S415, the small cell 125A notifies the macro cell 115 and the small cells 125B-D about the discovery signal duty cycle being used by the small cell 125A to transmit discovery signals.

As is discussed above with reference to FIG. 2, the active neighboring cells that receive a notification identifying the discovery signal duty cycle used by a dormant small cell may then use the information regarding the discovery signal duty cycle to control the measurement duty cycle of legacy UEs attached to the neighboring cells. For example, the macro cell 115 may use the discovery signal duty cycle information sent by the small cell 125A in step S415 to set the measurement duty cycle of the UE 130 such that the measurement duty cycle aligns with the discovery signal transmission pattern of the small cell 125A, thereby allowing UE 130, which is a legacy UE for the purposes of the instant example, to discover the small cell 125A, which is a dormant cell for the purposes of the instant example. For example, the macro cell 115 may set the measurement duty cycle of the UE 130 by controlling the points in time when the UE 130 wakes up from a DRX state to enter an 'on' state as is shown in FIG. 2.

In step S420, the small cell 125A may transmit the discovery signals in accordance with the duty cycle notified in step S415. For example, the small cell 125A may send discovery signals using an active/DTX pattern that follows the discovery signal duty cycle previously set by the small cell 125A and notified by the small cell 125A in step S415.

As is discussed above, the types of signals used transmitted by dormant small cells of the wireless communications network 100 may be PSS/SSS/CRS signals. For example, the small cell 125A may transmit PSS/SSS signals as discovery signals in order to facilitate small cell discovery. Further, the small cell 125A may also transmit CRS signals, along with the PSS/SSS signals, in order to enable the UEs to perform reliable RRM measurements, perform channel tracking, and perform CSI measurements.

In step S425, the small cell 125A determines whether or not a trigger exists for transitioning from the dormant state to the active state. Some example conditions for triggering a dormant small cell to become active are discussed in 3GPP TR 36.872 V12.1.0.

According to at least one example embodiment, the small cell 125A may become active as a result of the UE 130 discovering the small cell 125A through the discovery signals sent by the small cell 125A, performing signal quality/power measurements, determining the small el 125A to be suitable for a handover operation, and notifying the wireless communications network 100 of the suitability of the small cell 125A for a handover operation thereby triggering the wireless communication network 100 to cause the small cell 125A to be activated.

If, in step S425, no activation trigger is detected, the small cell 125A may continue waiting for an activation trigger.

If, in step S425, an activation trigger is detected, the small cell 125A may proceed to step S430.

In step S430, the small cell 125A may enter an active state. For example, if the small cell 125A was triggered to activate as a result of being discovered by the UE 130, the UE 130 may attach to the small cell 125A after the small cell 125A changes states from a dormant state to an active state.

Figure 5:
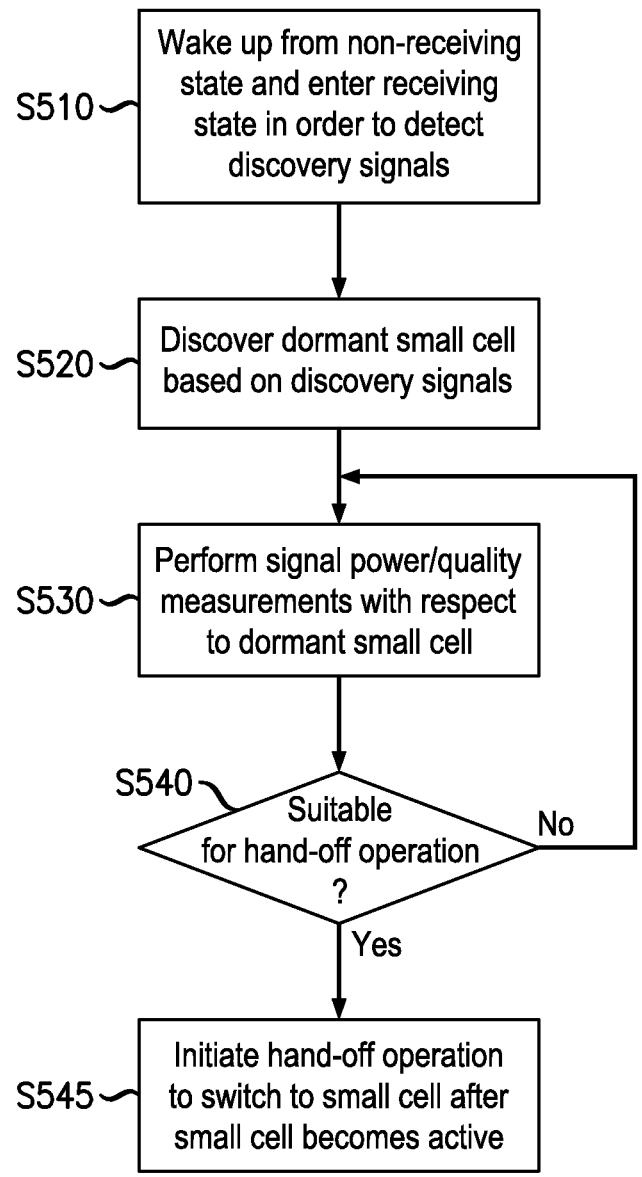
FIG. 5 illustrates an example of operating a UE to facilitate dormant small cell discovery according to at least one example embodiment.

FIG. 5 illustrates an example of operating a UE to facilitate dormant small cell discovery according to at least one example embodiment.

Referring to FIG. 5, in step S510, the UE 130 wakes up from DRX cycle and performs a cell search. For example, as is discussed above with reference to FIGS. 2 and 4, the macro cell 115 may use discovery signal duty cycle information sent by dormant small cell (e.g., the small cell 125A) to set the DRX cycle of the UE 130 such that the measurement duty cycle, which defines the 'on' portions of the measurement pattern when the UEs wake up from the DRX state, aligns with the discovery signal transmission pattern of the dormant small cell, thereby allowing UE 130, which is a legacy UE for the purposes of the instant example, to discover the dormant small cell. Using FIG. 2 as an example, the points in time where the legacy UEs wake up from a DRX state are indicated as 'on' portions or high portions of the legacy UE measurement waveforms illustrated in FIG. 2 for legacy UEs 1-4. As is shown in FIG. 2, the 'on' portions of the UE measurement waveforms of legacy UEs 1-4 are aligned with the active portions of the dormant cell discovery signal transmission waveforms, 210. This alignment may be caused by a cell controlling the 'on' and DRX measurement states of the legacy UEs 1-4. The 'on' and DRX states of the UE 130 are controlled by the macro cell 115 in the same manner illustrated in FIG. 2 and discussed above with reference to the legacy UEs 1-4.

In step S520, the UE 130 discovers a dormant cell by detecting discovery signals sent from the dormant cell. The UE 130 may detect the discovery signals as a result of performing the cell search in step S510. For example, the UE 130 may receive discovery signals being transmitted by the dormant small cell 125A. The UE 130 may discover the small cell 125A as a result of, for example, PSS/SSS signals included the discovery signals received from the small cell 125A.

In step S530, the UE 130 performs signal power/quality measurements with respect to the discovery signals of the dormant cell. For example the UE 130 may perform RRM measurements, such as RSRP measurements, and report the RRM measurements back to the macro cell 115. The RRM measurements may be performed by the UE 130 based on CRS signals included in the discovery signals transmitted by the small cell 125A. Further, the UE 130 may also perform cell tracking and CSI measurements based on CRS signals included in the discovery signals transmitted by the small cell 125A.

Based on the measurements performed in step S530, the UE may determine in step S540 whether or not the dormant small cell 125A is suitable for handoff operation. For example, the UE 130 may make the determination by comparing to the RRM measurements to threshold values. As another example, the UE 130 may report the RRM measurement to the macro cell 115, and the macro cell 115 may make a determination as to whether or not the small cell 125A is suitable for a handover operation with the UE 130. The macro cell 115 may send the results of the determination made by the macro cell 115 back to the UE 130, and the UE 130 may determine whether or not the dormant small cell 125A is suitable for a handoff operation based on the decision made by the macro cell 115.

If, in step S540, the UE 130 determines that the small cell 125A is not suitable for a handover operation with the UE 130, the UE 130 may continue listening for discovery signals periodically by returning to step S520.

If, in step S540, the UE 130 determines that the small cell 125A is suitable for a handover operation with the UE 130, the determination may trigger wireless communications network 100 to activate the dormant small cell 125A in step S545 and initiate a handover operation to switch the UE 130 from the macro cell 115 to the newly activated small cell 125A.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of facilitating dormant small cell discovery in a wireless communications network including at least a first small cell and a second cell, the method comprising:
    changing, at a first small cell base station (BS) controlling the first small cell, an operating state of the first small cell from an active state to a dormant state, the active state being a state in which the first small cell transmits downlink (DL) signals including a primary synchronization signal (PSS), a secondary synchronization signal (SSS), and a cell-specific reference signal (CRS), transmits DL broadcast channels, and transmits DL control channels, the dormant state being a state in which the first small cell transmits discovery signals and does not transmit DL broadcast or DL control channels, the discovery signals being signals through which user equipments (UE)s discover the first small cell while the first small cell is in the dormant state;
    sending, from the first small cell BS while the first small cell in the dormant state, a notification, the notification identifying, for at least the second cell, a duty cycle with which the first small cell will periodically transmit the discovery signals; and
    transmitting, from the first small cell BS while the first small cell is in the dormant state, the discovery signals using a periodic transmission pattern, the periodic transmission pattern including active portions during which the first small cell transmits the discovery signals and non-active portions during which the first small cell does not transmit the discovery signals, the active and non-active portions being defined by the duty cycle; and
    performing, at the first small cell, procedures associated with small cell on/off transitions, radio resource management (RRM) measurements, channel tracking, and channel state information measurements, while the first small cell is in the dormant state such that a time for transitioning the first small cell from the dormant state to the active state is less than 40 ms.

2. The method of claim 1, wherein the wireless communications network is a long term evolution (LTE) network implementing a small cell on/off interference mitigation scheme, and
    wherein the discovery signals include PSS, SSS, and CRS signals.

3. The method of claim 1 further comprising:
    transitioning the first small cell from the dormant state to the active state based on the procedures and measurements associated with small cell on/off transitions.

4. The method of claim 3 wherein the time for transitioning the first small cell from the dormant state to the active state is about 40 ms or less.

5. A method of facilitating dormant small cell discovery in a wireless communications network including at least a first small cell and a second cell, the first small cell being in a dormant state in which the first small cell does not transmit downlink (DL) broadcast or DL control channels and the first small cell does transmit discovery signals using a periodic transmission pattern, the periodic transmission pattern including active transmission portions during which the first small cell transmits the discovery signals and non-active transmission portions during which the first small cell does not transmit the discovery signals, the method comprising:
    receiving, at a user equipment (UE) attached to the second cell, search control information sent from the second cell, the search control information is based on a notification received by the second cell from the first small cell, while the first small cell is in a dormant state, the notification including a duty cycle with which the first small cell will periodically transmit the discover signals; and
    configuring, at the UE, a duty cycle of a periodic signal measurement pattern of the UE based on the received search control information, the periodic signal measurement pattern including active reception portions during which the UE actively listens for the discovery signals and non-active reception portions during which the UE does not actively listen for the discovery signals;
    receiving, at the UE, the discovery signals;
    performing, at the UE, procedures and measurements associated with small cell on/off transitions, radio resource management (RRM) measurements, channel tracking, and channel state information measurements while the first small cell is in a dormant state such that a time for transitioning the first small cell from the dormant state to an active state is less than 40 ms; and
    discovering, at the UE, the first small cell based on the discovery signals,
    wherein the search control information causes the UE to configure a duty cycle of the periodic signal measurement pattern of the UE such that the active reception portions of the periodic signal measurement pattern align with the active transmission portions of the periodic transmission pattern.

6. The method of claim 5, wherein the UE is a Release (Rel-)8, Rel-9, Rel-10, or Rel-11 UE.

7. The method of claim 5, wherein IDLE mode UEs cannot access the first small cell while the first small cell is in the dormant state because the dormant first small cell does not transmit either of the DL broadcast and DL control channels.

8. The method of claim 6, wherein the wireless communications network is a long term evolution (LTE) network implementing a small cell on/off interference mitigation scheme, and
wherein the discovery signals received at the UE include a primary synchronization signal (PSS), a secondary synchronization signal (SSS), and a cell-specific reference signal (CRS).

9. The method of claim 8, wherein the UE discovers the first small cell based on the PSS and SSS signals.

10. The method of claim 8, further comprising:
performing, at the UE, channel tracking with respect to the first small cell based on the CRS.

11. A method of facilitating dormant small cell discovery in a wireless communications network including at least a first cell and a second cell, the second cell being in a dormant state in which the second cell does not transmit downlink (DL) broadcast or DL control channels and the second cell does transmit discovery signals using a periodic transmission pattern, the periodic transmission pattern including active transmission portions during which the second cell transmits the discovery signals and non-active transmission portions during which the second cell does not transmit the discovery signals, the method comprising:
receiving, at the first cell, a notification sent by the second cell, while the second cell is in the dormant state, the notification identifying a duty cycle indicating lengths of the active transmission portions of the periodic transmission pattern used by the second cell to transmit the discovery signals;
generating, at the first cell, search control information based on the duty cycle identified by the notification received from the second cell; and
sending, from the first cell to one or more UEs attached to the first cell, the search control information, the search control information including information for causing the one or more UEs to configure respective duty cycles of periodic signal measurement patterns of the one or more UEs such that active reception portions of the periodic signal measurement patterns align with the active transmission portions of the periodic transmission pattern of the second cell, the periodic signal measurement patterns of the one or more UEs each including both the active reception portions during which the one or more UEs actively listen for discovery signals, receive discovery signals and perform procedures and measurements associated with small cell on/off transitions for received discovery signals, radio resource management (RRM) measurements, channel tracking, and channel state information measurements, such that a time for transitioning the second cell from the dormant state to an active state is less than 40 ms and non-active reception portions during which the one or more UEs do not actively listen for discovery signals.

12. The method of claim 11, wherein the one or more UEs to which the first cell sends the search control information are Release (Rel-)8, Rel-9, Rel-10, or Rel-11 UEs, and
wherein the wireless communications network is a long term evolution (LTE) network implementing a small cell on/off interference mitigation scheme.

13. The method of claim 11, wherein IDLE mode UEs cannot access the second cell while the second cell is in the dormant state because the second cell does not transmit either of the DL broadcast and control channels.

* * * * *